B. W. FJELLMAN
AUTOMATIC CENTERING SPINDLE.
APPLICATION FILED JUNE 17, 1914.
1,163,990.
Patented Dec. 14, 1915.
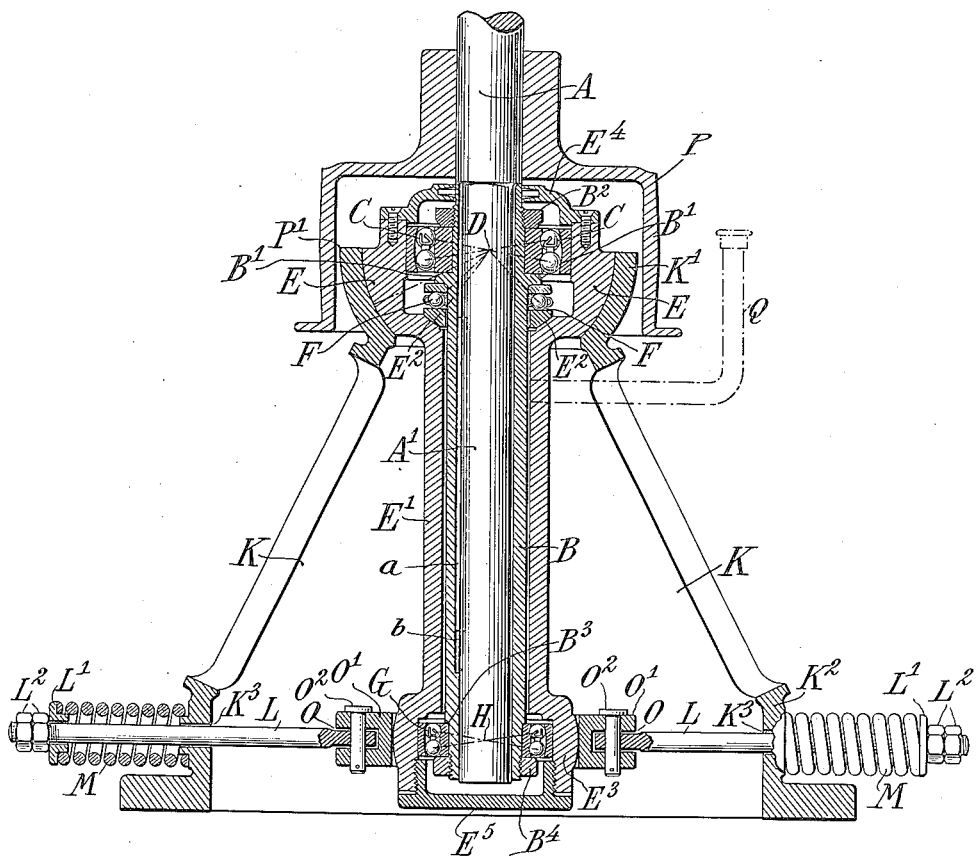
WITNESSES:
René Bruine
Fred White
INVENTOR :
Bengt Wiktor Fjellman,
By Attorneys,
Fraser, Dunk & Myers

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

AUTOMATIC CENTERING-SPINDLE.

1,163,990. Specification of Letters Patent. Patented Dec. 14, 1915.

Application filed June 17, 1914. Serial No. 845,597.

*To all whom it may concern:*

Be it known that I, BENGT WIKTOR FJELLMAN, a subject of the King of Sweden, residing at Gottenborg, Sweden, have invented certain new and useful Improvements in Automatic Centering-Spindles, of which the following is a specification.

This invention relates to improvements in the mounting of shafts and has particular reference to that form of mounting a vertical shaft, as for example that of a centrifugal machine, wherein a spherical bearing is provided in the length of the shaft.

The invention comprises in combination a hollow spherical bearing and a hollow non-rotary or substantially non-rotary sleeve surrounding the shaft and having at or near its upper extremity an enlargement providing an outer spherical surface to coöperate with the said spherical bearing to resist downward axial thrust of the shaft while the sleeve itself is extended downward past the hollow spherical bearing and a resilient or other device coöperating with the lower end of the sleeve to limit transverse movement thereof. Preferably the construction is such that the hollow sleeve surrounds the lower portion of the shaft and provides at or near its extremities bearings for the shaft. According to a modified construction there is disposed within the hollow sleeve aforesaid an inner sleeve secured to the shaft in such a manner that while circumferential movement between it and the shaft is prevented, axial movement between them is permitted, there being bearings disposed between the two sleeves to facilitate their relative rotation about the axis of the shaft.

According to a further modification the hollow sleeve projects through a central recess in the hollow spherical bearing and has at its lower extremity another enlargement which receives a lower bearing but which is of such dimensions that it will pass through the central recess aforesaid.

A further feature of the invention comprises a device to limit the transverse movement of the lower extremity of the shaft which includes spring-controlled radial projections operatively connected to the said lower extremity.

Other features of the invention will be best understood from the following description taken in conjunction with the accompanying drawing which illustrates in central vertical section a preferred construction.

A vertically disposed shaft A has a reduced portion A' which is surrounded by a sleeve B secured to it in such a manner that while relative axial movement between the portion A' of the shaft A and the sleeve B is permitted, relative circumferential movement is prevented. This may be conveniently effected by the use of keys $a$ and key-ways $b$. At its upper end the sleeve B carries a radial ball-bearing denoted as a whole by the reference letter C, the latter being held between a flange B' on the sleeve and a nut $B^2$ screwing on to a correspondingly threaded portion of the sleeve as shown. The ball-bearing C preferably has a spherically formed outer track whose center is located at a point D in the axis of the shaft A A'.

The outer track of the ball-bearing C fits within an enlargement E on an outer sleeve E', the outer surface of the enlargement E being spherically formed as illustrated, the center of the sphere being also located at the point D. The sleeve $E^1$ is substantially non-rotary about its vertical axis, that is to say its function is not to rotate about its vertical axis although a small movement of this kind may at times take place, as there is no means which positively prevents it from so rotating. It could be, if preferred, positively held against rotation. The enlargement E has an inner spherical surface $E^2$ struck from the center D and coöperating with a correspondingly curved surface of a lower member of a thrust ball bearing F.

The lower extremity of the sleeve $E^1$ terminates in an enlargement $E^3$ forming a recess in which is disposed a radial ball bearing G preferably of the type having a spherical outer track whose center of curvature is located at the point H in the axis of the shaft. The inner track of the bearing G is secured to the sleeve B between a shoulder $B^3$ formed thereon and a nut $B^4$ screwing on to a correspondingly threaded portion of the sleeve B.

A housing K has at its upper extremity a basin-like portion $K^1$ whose inner surface is spherically formed to correspond to that of the spherically formed surface of the enlargement E, and has a central recess in its under side the diameter of which recess is sufficiently large to allow the enlargement E³ to pass through it.

The housing K terminates at its lower extremity in an annular base portion K² having orifices K³ through which slide rods L. The outer ends of the rods L have each a collar L' between which and the outer surface of the annular portion K² is disposed a spring M, the tension of the spring being regulated by the adjusting nuts L² provided at the extremity of the rod L.

The inner extremity of the rod L is pivoted in a recess O in a ring O¹ by means of a pin O². The ring O¹ encircles the enlargement E³ so as to be always in contact with it, and as shown the enlargement E³ is preferably formed with a spherical outer surface struck from the center H while the inner surface of the ring O¹ is cylindrical. As a modification instead of forming the enlargement E³ with a spherical outer surface the latter may be provided by a ring fitting over the enlargement which itself may be cylindrically formed while the outer surface of the ring is spherically formed. The ring may be made to slide on the enlargement or it may be secured rigidly to it. In either case a corresponding spherical surface may be provided as the inner surface of the ring O¹, the center of curvature of which is also at H so that it fits snugly over the enlargement E³.

Generally speaking, slackness of the various joints permits the free movement of the ring, allowing it to tilt as the shaft A¹ oscillates about the center D. Thus the recesses O may be larger than the desired degree than the inner ends of the rods L in them.

For driving the shaft A a pulley P may be conveniently keyed or otherwise secured thereon. This pulley is hollow as illustrated and overhangs the upper basin-like member K¹ to such an extent that its central plane P¹, in a direction transverse to the axis of the shaft, passes through the center D. The upper end of the enlargement E is closed by means of a cap E⁴ which is itself centrally recessed to receive the sleeve B and is formed as a packed gland surrounding the sleeve. The lower extremity E³ is closed by a cap E⁵ as illustrated. An oil-supply duct Q shown in dotted lines in the drawing may be employed to supply oil to the lower bearing while the construction is such that the sleeve E¹ may be entirely filled with oil to enable the upper bearings also to be lubricated.

From the foregoing it will be seen that the lower portion of the shaft A is permitted to oscillate about the center D by reason of the spherical bearing surface whose center of curvature is located at that center, and the degree of transverse movement thus imparted to the lower end of the shaft is controlled by the springs M which normally tend to return the shaft to its vertical position. By mounting the pulley as described the resultant of the belt pressure will to all intents and purposes act transversely to the shaft through the center D, and will therefore not act to swing the shaft laterally, the radial thrust transmitted to the shaft being practically all taken by the ball-bearing C.

A feature of advantage of the afore-described construction lies in the fact that the shaft and the parts connected thereto including the ball-bearings and the sleeve surrounding the same, may be lifted out and bodily removed from the supporting basin-like hollow bearing without dismounting the springs.

Another advantage is obtained from the disposition of the springs in such a manner that they are easily accessible while they act on a comparatively long lever-arm.

A further advantage lies in the fact that in the embodiment shown and described the shaft A A¹ may be removed independently of any of the bearing parts, as it may be withdrawn from the sleeve B without disturbing that latter member at all. Also by the concentricity of the several bearing surfaces about the center D, defects in the seatings of the bearings are eliminated.

It is obvious that there must be sufficient slack between the radial arms and the slots through which they pass in the outer ring-support to permit of the required oscillation of the parts.

Various modifications may be made in the details of construction, for example, the ball-bearings such as C, F and G instead of being secured to a sleeve such as B, could be secured directly to the shaft A. Again, the springs M instead of being disposed outside the ring K² could have been equally well disposed inside the ring between it and collars on the rods L, in which case the springs will take less room and will be protected from external damage or shock. As a modification the springs may be tension springs secured between the ring O¹ and the part K² of the housing having preferably adjustable means, such as adjusting nuts for regulating the tension of the springs.

As a further modification, the spherical enlargement E instead of terminating at its upper extremity as illustrated on the level of the horizontal plane passing through the center D, may be extended beyond and above that plane while the basin-like member K¹ would then be surrounded by a ring screwed on or otherwise secured to it, the ring having a spherical inner surface to contact and coöperate with the extended portion of the spherical enlargement E.

Obviously either or both the sleeves E¹ or B may be made of two or more parts connected together in any desired manner instead of each of them being integral sleeves as illustrated. Also ball-bearings illustrated may be replaced by any other form of bearing, such as a journal-bearing, as may be desired.

I claim as my invention:—

1. The combination with a vertical shaft, of a hollow spherical bearing, a substantially non-rotary sleeve surrounding the shaft and having an upper enlargement providing an outer spherical surface to coöperate with the said spherical bearing to resist downward axial thrust of the shaft, the sleeve being extended downwardly past the spherical bearing, a resilient device coöperating with the lower end of the sleeve to elastically resist the transverse movement thereof, a sleeve interposed between the said non-rotary sleeve and the shaft, and upper and lower radial ball bearings for the said shaft interposed between said sleeves.

2. The combination with a vertical shaft, of a hollow spherical bearing, a substantially non-rotary sleeve surrounding the shaft and having an upper enlargement providing an outer spherical surface to coöperate with the said spherical bearing to resist downward axial thrust of the shaft, the sleeve being extended downwardly past the spherical bearing, a resilient device coöperating with the lower end of the sleeve to elastically resist the transverse movement thereof, a sleeve within the non-rotary sleeve and secured to the shaft in such manner as to prevent independent circumferential movement between it and the shaft but to permit axial movement between the same, and radial and thrust ball bearings interposed between the said sleeves.

3. The combination with a vertical shaft, of a hollow spherical bearing, a substantially non-rotary sleeve surrounding the shaft and having an upper enlargement providing an outer spherical surface to coöperate with the said spherical bearing to resist downward axial thrust of the shaft, the sleeve being extended downwardly past the spherical bearing, said sleeve having at its lower portion an enlargement for housing a lower bearing and being of such dimensions that it can pass through the said spherical bearing, and a ball bearing in such enlargement for the said shaft.

4. In a device for steadying a vertical shaft, the combination with a sleeve having an outer spherical face, of a housing surrounding the shaft, a ring within said housing surrounding and engaging the said spherical face, radial arms pivotally connected to the ring and projecting through the housing, and controlling springs disposed outwardly of the said housing and operative upon the said arms.

5. The combination with a vertical shaft, of a hollow spherical bearing, a substantially non-rotary sleeve surrounding the shaft and having an upper enlargement providing an outer spherical surface to coöperate with the said spherical bearing to resist downward axial thrust of the shaft, the sleeve being extended downwardly past the hollow spherical bearing, said sleeve having at its lower portion an enlargement for housing a lower bearing and being of such dimensions that it can pass through the said hollow spherical bearing, a ball bearing in said enlargement for the said shaft, a ring surrounding the said enlargement, radial arms pivotally connected to said ring and projecting through the housing, and controlling springs disposed outwardly of the housing and operative upon the said arms.

6. The combination with a hollow spherical bearing, of a vertically disposed sleeve having an upper enlargement providing an outer spherical surface to coöperate with the said spherical bearing to resist downward thrust, the sleeve being extended downwardly past the said spherical bearing, a ring surrounding the lower end of the said sleeve, a resilient device coöperating with the ring to elastically resist the transverse movement of the sleeve, a sleeve disposed within the above recited sleeve, radial and thrust ball bearings between said sleeves, means for uniting the same into a self-contained structure removable bodily from the said spherical bearing and ring, and a shaft disposed in said second or inner sleeve and adapted to move axially therein and to be demountable therefrom.

7. The combination with a hollow spherical bearing, of a vertically disposed sleeve having an upper enlargement providing an outer spherical surface to coöperate with the said spherical bearing to resist downward thrust, the sleeve being extended downwardly past the said spherical bearing, a ring surrounding the lower end of the said sleeve, a resilient device coöperating with the ring to elastically resist the transverse movement of the sleeve, a sleeve disposed within the above recited sleeve, a shaft disposed in the said second or inner sleeve, radial and thrust bearings between said sleeves at the upper end and being so formed that the lines of load radiate from a center common to these and the said spherical bearing and located at the axis of the said shaft.

8. The combination with a hollow spherical bearing, of a vertically disposed sleeve having an upper enlargement providing an outer spherical surface to coöperate with the said spherical bearing to resist downward thrust, the sleeve being extended downwardly past the said spherical bearing, a ring surrounding the lower end of the said sleeve, a resilient device coöperating with the ring to elastically resist the transverse movement of the sleeve, a sleeve disposed within the above recited sleeve, a shaft disposed in the said second or inner sleeve, radial and thrust bearings between said sleeves and the upper end and being so formed that the lines of load radiate from a center common to these and the said spherical bearing and located at the axis of the said shaft, and a pulley located in such position on the said shaft that the said center lies in its central plane.

In witness whereof, I have hereunto signed my name in the presence of two subscribing witnesses.

BENGT WIKTOR FJELLMAN.

Witnesses:
    Aug. Johanson,
    Eric Swanstram.